(12) United States Patent
Dewasurendra et al.

(10) Patent No.: US 12,688,860 B2
(45) Date of Patent: Jul. 21, 2026

US012688860B2

(54) AUDIO CODING USING COMBINATION OF MACHINE LEARNING BASED TIME-VARYING FILTER AND LINEAR PREDICTIVE CODING FILTER

(71) Applicant: QUALCOMM Incorporated, San Diego, CA (US)

(72) Inventors: Duminda Dewasurendra, San Diego, CA (US); Guillaume Konrad Sautiere, Amsterdam (NL); Zisis Iason Skordilis, San Diego, CA (US); Vivek Rajendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 18/689,054

(22) PCT Filed: Oct. 10, 2022

(86) PCT No.: PCT/US2022/077866
§ 371 (c)(1),
(2) Date: Mar. 4, 2024

(87) PCT Pub. No.: WO2023/064736
PCT Pub. Date: Apr. 20, 2023

(65) Prior Publication Data

US 2024/0428814 A1 Dec. 26, 2024

(30) Foreign Application Priority Data

Oct. 14, 2021 (GR) .............................. 20210100698

(51) Int. Cl.
*G10L 19/08* (2013.01)
*G10L 19/12* (2013.01)
(Continued)

(52) U.S. Cl.
CPC .............. *G10L 19/08* (2013.01); *G10L 19/12* (2013.01); *G10L 25/24* (2013.01); *G10L 25/30* (2013.01)

(58) Field of Classification Search
CPC ....... G10L 25/30; G10L 13/047; G10L 19/08; G10L 19/12; G10L 19/16
See application file for complete search history.

(56) References Cited

U.S. PATENT DOCUMENTS 6,041,296 A * 3/2000 Welling .................. G10L 19/06 704/E19.024
2002/0052734 A1* 5/2002 Unno ...................... G10L 19/10 704/207

(Continued)

FOREIGN PATENT DOCUMENTS

WO 2020145472 A1 7/2020
WO 2020208137 A1 10/2020

OTHER PUBLICATIONS

Valin, Jean-Marc, and Jan Skoglund. "LPCNet: Improving neural speech synthesis through linear prediction." ICASSP 2019—2019 IEEE International Conference on Acoustics, Speech and Signal Processing (ICASSP). IEEE, 2019.*

(Continued)

*Primary Examiner* — Shaun Roberts
(74) *Attorney, Agent, or Firm* — QUALCOMM Incorporated; Espartaco Diaz Hidalgo

(57) ABSTRACT

Systems and techniques are described for coding audio signals. For example, a voice decoder can generate, using a neural network, an excitation signal for at least one sample of an audio signal based on one or more inputs to the neural network, the excitation signal being configured to excite a linear predictive coding (LPC) filter. The voice decoder can further generate, using the LPC filter based on the excitation signal, at least one sample of a reconstructed audio signal.
(Continued)

For example, the neural network can generate coefficients for one or more linear time-varying filters (e.g., a linear time-varying harmonic filter and a linear time-varying noise filter). The voice decoder can use the one or more linear time-varying filters including the generated coefficients to generate the excitation signal.

30 Claims, 9 Drawing Sheets

(51) Int. Cl.
*G10L 25/24* (2013.01)
*G10L 25/30* (2013.01)

(56) References Cited

U.S. PATENT DOCUMENTS

| | | | | |
|---|---|---|---|---|
| 2002/0120438 | A1* | 8/2002 | Lin | G10L 19/12 704/207 |
| 2011/0295598 | A1* | 12/2011 | Yang | G10L 21/038 704/205 |
| 2012/0095758 | A1* | 4/2012 | Gibbs | G10L 21/038 704/219 |
| 2016/0078878 | A1* | 3/2016 | Ravelli | G10L 19/265 704/501 |
| 2021/0074308 | A1 | 3/2021 | Skordilis et al. | |
| 2021/0090584 | A1* | 3/2021 | Yu | G10L 19/16 |
| 2021/0193112 | A1* | 6/2021 | Cui | G06N 3/0442 |
| 2021/0366461 | A1* | 11/2021 | Ahmed | G10L 15/16 |
| 2022/0358904 | A1* | 11/2022 | Mandel | G10L 13/047 |
| 2023/0016637 | A1* | 1/2023 | Schmidt | G06N 3/045 |
| 2023/0215420 | A1* | 7/2023 | Yu | G10L 25/30 704/259 |
| 2024/0127832 | A1* | 4/2024 | Ahmed | G06N 3/0464 |
| 2024/0428813 | A1 | 12/2024 | Sautiere | |

OTHER PUBLICATIONS

Valin, Jean-Marc, and Jan Skoglund. "A real-time wideband neural vocoder at 1.6 kb/s using LPCNet." arXiv preprint arXiv: 1903. 12087 (2019).*

Ai, Yang, Hong-Chuan Wu, and Zhen-Hua Ling. "SampleRNN-based neural vocoder for statistical parametric speech synthesis." 2018 IEEE International Conference on Acoustics, Speech and Signal Processing (ICASSP). IEEE, 2018.*

Wang, Xin, Shinji Takaki, and Junichi Yamagishi. "Neural source-filter-based waveform model for statistical parametric speech synthesis." ICASSP 2019—2019 IEEE International Conference on Acoustics, Speech and Signal Processing (ICASSP). IEEE, 2019.*

Song, Eunwoo, Kyungguen Byun, and Hong-Goo Kang. "ExcitNet vocoder: A neural excitation model for parametric speech synthesis systems." 2019 27th European Signal Processing Conference (EUSIPCO). IEEE, 2019.*

International Search Report and Written Opinion—PCT/US2022/077866—ISA/EPO—Jan. 18, 2023.

Li Y., et al., "Deep Neural Network-Based Linear Predictive Parameter Estimations For Speech Enhancement", IET Signal Processing, The Institution of Engineering and Technology, Michael Faraday House, Six Hills Way, Stevenage, Herts. SG1 2AY, UK, vol. 11, No. 4, Jun. 1, 2017, pp. 469-476, XP006061841.

Partial International Search Report—PCT/US2022/077866—ISA/EPO—Dec. 14, 2022.

* cited by examiner

AUDIO CODING USING COMBINATION OF MACHINE LEARNING BASED TIME-VARYING FILTER AND LINEAR PREDICTIVE CODING FILTER

CROSS-REFERENCE TO RELATED APPLICATIONS

This application for Patent is a 371 of international Patent Application PCT/US2022/077866, filed Oct. 10, 2022, which claims priority to Greek Patent Application 20210100698, filed Oct. 14, 2021, all of which are hereby incorporated by referenced in their entirety and for all purposes.

FIELD

The present disclosure is generally related to audio coding (e.g., audio encoding and/or decoding). For example, systems and techniques are described for performing audio coding at least in part by combining a linear time-varying filter generated by a machine learning system (e.g., a neural network based model) with a linear predictive coding (LPC) filter.

BACKGROUND

Audio coding (also referred to as voice coding and/or speech coding) is a technique used to represent a digitized audio signal using as few bits as possible (thus compressing the speech data), while attempting to maintain a certain level of audio quality. An audio or voice encoder is used to encode (or compress) the digitized audio (e.g., speech, music, etc.) signal to a lower bit-rate stream of data. The lower bit-rate stream of data can be input to an audio or voice decoder, which decodes the stream of data and constructs an approximation or reconstruction of the original signal. The audio or voice encoder-decoder structure can be referred to as an audio coder (or voice coder or speech coder) or an audio/voice/speech coder-decoder (codec).

Audio coders exploit the fact that speech signals are highly correlated waveforms. Some speech coding techniques are based on a source-filter model of speech production, which assumes that the vocal cords are the source of spectrally flat sound (an excitation signal), and that the vocal tract acts as a filter to spectrally shape the various sounds of speech. The different phonemes (e.g., vowels, fricatives, and voice fricatives) can be distinguished by their excitation (source) and spectral shape (filter).

SUMMARY

Systems and techniques are described herein for performing audio coding at least in part by combining a linear time-varying filter generated by a machine learning system (e.g., a neural network based model) with a linear predictive coding (LPC) filter.

According to at least one example, a method is provided for reconstructing one or more audio signals. The method includes: generating, using a neural network, an excitation signal for at least one sample of an audio signal based on one or more inputs to the neural network, the excitation signal being configured to excite a linear predictive coding (LPC) filter; and generating, using the LPC filter based on the excitation signal, at least one sample of a reconstructed audio signal.

In another example, an apparatus for reconstructing one or more audio signals is provided that includes a memory (e.g., configured to store data, such as virtual content data, one or more images, etc.) and one or more processors (e.g., implemented in circuitry) coupled to the memory. The one or more processors are configured to and can: generate, using a neural network, an excitation signal for at least one sample of an audio signal based on one or more inputs to the neural network, the excitation signal being configured to excite a linear predictive code (LPC) filter; and generate, using the LPC filter based on the excitation signal, at least one sample of a reconstructed audio signal.

In another example, anon-transitory computer-readable medium is provided that has stored thereon instructions that, when executed by one or more processors, cause the one or more processors to: generate, using a neural network, an excitation signal for at least one sample of an audio signal based on one or more inputs to the neural network, the excitation signal being configured to excite a linear predictive code (LPC) filter; and generate, using the LPC filter based on the excitation signal, at least one sample of a reconstructed audio signal.

In another example, an apparatus for reconstructing one or more audio signals is provided. The apparatus includes: means for generating, using a neural network, an excitation signal for at least one sample of an audio signal based on one or more inputs to the neural network, the excitation signal being configured to excite a linear predictive coding (LPC) filter; and means for generating, using the LPC filter based on the excitation signal, at least one sample of a reconstructed audio signal.

In some aspects, the one or more inputs to the neural network include features associated with the audio signal. In some cases, the features include log-Mel-frequency spectrum features.

In some aspects, the LPC filter is a time-varying LPC filter.

In some aspects, the method, apparatuses, and computer-readable medium described above can include using filter coefficients of the LPC filter in the decoder to generate the at least one sample of the reconstructed audio signal. In some aspects, the filter coefficients of the LPC filter are generated based on an autocorrelation of an input audio signal in a voice encoder. In some aspects, the method, apparatuses, and computer-readable medium described above can include deriving the filter coefficients of the LPC filter based on features received from a voice encoder. In some cases, the features include Mel spectrum features or other features.

In some aspects, the method, apparatuses, and computer-readable medium described above can include: generating, using the neural network, a harmonic filter output and a noise filter output. In some aspects, to generate the excitation signal, the method, apparatuses, and computer-readable medium described above can include combining the harmonic filter output with the noise filter output.

In some aspects, the method, apparatuses, and computer-readable medium described above can include: inputting a pulse train signal based on pitch features to a harmonic filter generated using the neural network; generating a harmonic filter output; inputting a random noise signal to a noise filter generated using the neural network; generating a noise filter output; and generating the excitation signal at least in part by combining the harmonic filter output with the noise filter output.

In some aspects, to generate the excitation signal for the at least one sample of the audio signal using the neural network, the method, apparatuses, and computer-readable medium described above can include generating, using the neural network, coefficients for one or more linear time-varying filters; and generating, using the one or more linear time-varying filters including the generated coefficients, the excitation signal. In some aspects, the one or more linear time-varying filters include a linear time-varying harmonic filter and a linear time-varying noise filter.

In some aspects, to generate the excitation signal for the at least one sample of the audio signal, the method, apparatuses, and computer-readable medium described above can include: generating, using the neural network, an additional excitation signal for a linear time-invariant filter; and generating, using the linear time-invariant filter based on the additional excitation signal, the excitation signal.

According to at least one additional example, a method is provided for reconstructing one or more audio signals, including: generating, using a linear predictive coding (LPC) filter based on an excitation signal, a predicted signal for at least one sample of an audio signal, the predicted signal being configured to excite a linear time-varying filter; generating, using a neural network, coefficients for the linear time-varying filter; and generating, using the linear time-varying filter based on the coefficients, at least one sample of a reconstructed audio signal.

In another example, an apparatus for reconstructing one or more audio signals is provided that includes a memory (e.g., configured to store data, such as virtual content data, one or more images, etc.) and one or more processors (e.g., implemented in circuitry) coupled to the memory. The one or more processors are configured to and can: generate, using a linear predictive code (LPC) filter based on an excitation signal, a predicted signal for at least one sample of an audio signal, the predicted signal being configured to excite a linear time-varying filter; generate, using a neural network, coefficients for the linear time-varying filter; and generate, using the linear time-varying filter based on the coefficients, at least one sample of a reconstructed audio signal.

In another example, anon-transitory computer-readable medium is provided that has stored thereon instructions that, when executed by one or more processors, cause the one or more processors to: generate, using a linear predictive code (LPC) filter based on an excitation signal, a predicted signal for at least one sample of an audio signal, the predicted signal being configured to excite a linear time-varying filter; generate, using a neural network, coefficients for the linear time-varying filter; and generate, using the linear time-varying filter based on the coefficients, at least one sample of a reconstructed audio signal.

In another example, an apparatus for reconstructing one or more audio signals is provided. The apparatus includes: at least one memory configured to store audio data, at least one processor coupled to the at least one memory, the at least one processor configured to, means for generating, using a linear predictive coding (LPC) filter based on an excitation signal, a predicted signal for at least one sample of an audio signal, the predicted signal being configured to excite a linear time-varying filter; means for generating, using a neural network, coefficients for the linear time-varying filter; means for generating, using the linear time-varying filter based on the coefficients, at least one sample of a reconstructed audio signal.

The above-described aspects relating to any of the methods, apparatuses, and computer-readable media can be used individually or in any suitable combination.

In some aspects, the apparatuses can be or can be part of a mobile device (e.g., a mobile telephone or so-called "smart phone", a tablet computer, or other type of mobile device), a network-connected wearable device, an extended reality device (e.g., a virtual reality (VR) device, an augmented reality (AR) device, or a mixed reality (MR) device), a personal computer, a laptop computer, a server computer (e.g., a video server or other server device), a television, a vehicle (or a computing device or system of a vehicle), a camera (e.g., a digital camera, an Internet Protocol (IP) camera, etc.), a multi-camera system, a robotics device or system, an aviation device or system, or other device. In some aspects, the apparatuses include at least one camera for capturing one or more images or video frames. For example, the apparatuses can include a camera (e.g., an RGB camera) or multiple cameras for capturing one or more images and/or one or more videos including video frames. In some aspects, the apparatuses includes a display for displaying one or more images, videos, notifications, or other displayable data. In some aspects, the apparatuses includes a transmitter configured to transmit one or more video frame and/or syntax data over a transmission medium to at least one device. In some aspects, the apparatuses described above can include one or more sensors. In some aspects, the at least one processor of the apparatus includes a neural processing unit (NPU), a central processing unit (CPU), a digital signal processor (DSP), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Examples of various implementations are described in detail below with reference to the following figures.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Figure 1:
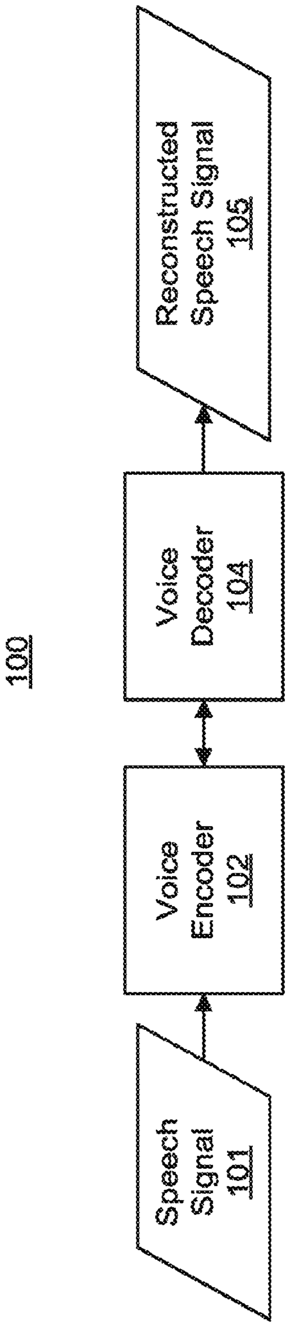
FIG. 1 is a block diagram illustrating an example of a voice coding system, in accordance with some examples.

Audio coding (e.g., speech coding, music signal coding, or other type of audio coding) can be performed on a digitized audio signal (e.g., a speech signal) to compress the amount of data for storage, transmission, and/or other use. FIG. 1 is a block diagram illustrating an example of a voice coding system 100 (which can also be referred to as a voice or speech coder or a voice coder-decoder (codec)). A voice encoder 102 of the voice coding system 100 can use a voice coding algorithm to process a speech signal 101. The speech signal 101 can include a digitized speech signal generated from an analog speech signal from a given source. For instance, the digitized speech signal can be generated using a filter to eliminate aliasing, a sampler to convert to discrete-time, and an analog-to-digital converter for converting the analog signal to the digital domain. The resulting digitized speech signal (e.g., speech signal 101) is a discrete-time speech signal with sample values (referred to herein as samples) that are also discretized.

Using the voice coding algorithm, the voice encoder 102 can generate a compressed signal (including a lower bit-rate stream of data) that represents the speech signal 101 using as few bits as possible, while attempting to maintain a certain quality level for the speech. The voice encoder 102 can use any suitable voice coding algorithm, such as a linear prediction coding algorithm (e.g., Code-excited linear prediction (CELP), algebraic-CELP (ACELP), or other linear prediction technique) or other voice coding algorithm.

The voice encoder 102 can compress the speech signal 101 in an attempt to reduce the bit-rate of the speech signal 101. The bit-rate of a signal is based on the sampling frequency and the number of bits per sample. For instance, the bit-rate of a speech signal can be determined as follows:

$$BR=S*b,$$

Where BR is the bit-rate, S is the sampling frequency, and b is the number of bits per sample. In one illustrative example, at a sampling frequency (S) of 8 kilohertz (kHz) and at 16 bits per sample (b), the bit-rate of a signal would be a bit-rate of 128 kilobits per second (kbps).

The compressed speech signal can then be stored and/or sent to and processed by a voice decoder 104. In some examples, the voice decoder 104 can communicate with the voice encoder 102, such as to request speech data, send feedback information, and/or provide other communications to the voice encoder 102. In some examples, the voice encoder 102 or a channel encoder can perform channel coding on the compressed speech signal before the compressed speech signal is sent to the voice decoder 104. For instance, channel coding can provide error protection to the bitstream of the compressed speech signal to protect the bitstream from noise and/or interference that can occur during transmission on a communication channel.

The voice decoder 104 can decode the data of the compressed speech signal and construct a reconstructed speech signal 105 that approximates the original speech signal 101. The reconstructed speech signal 105 includes a digitized, discrete-time signal that can have the same or similar bit-rate as that of the original speech signal 101. The voice decoder 104 can use an inverse of the voice coding algorithm used by the voice encoder 102, which as noted above can include any suitable voice coding algorithm, such as a linear prediction coding algorithm (e.g., CELP, ACELP, or other suitable linear prediction technique) or other voice coding algorithm. In some cases, the reconstructed speech signal 105 can be converted to continuous-time analog signal, such as by performing digital-to-analog conversion and anti-aliasing filtering.

Voice coders can exploit the fact that speech signals are highly correlated waveforms. The samples of an input speech signal can be divided into blocks of N samples each, where a block of N samples is referred to as a frame. In one illustrative example, each frame can be 10-20 milliseconds (ms) in length.

Various voice coding algorithms can be used to encode a speech signal. For instance, code-excited linear prediction (CELP) is one example of a voice coding algorithm. The CELP model is based on a source-filter model of speech production, which assumes that the vocal cords are the source of spectrally flat sound (an excitation signal), and that the vocal tract acts as a filter to spectrally shape the various sounds of speech. The different phonemes (e.g., vowels, fricatives, and voice fricatives) can be distinguished by their excitation (source) and spectral shape (filter).

In general, CELP uses a linear prediction (LP) model to model the vocal tract, and uses entries of a fixed codebook (FCB) as input to the LP model. For instance, long-term linear prediction can be used to model pitch of a speech signal, and short-term linear prediction can be used to model the spectral shape (phoneme) of the speech signal. Entries in the FCB are based on coding of a residual signal that remains after the long-term and short-term linear prediction modeling is performed. For example, long-term linear prediction and short-term linear prediction models can be used for speech synthesis, and a fixed codebook (FCB) can be searched during encoding to locate the best residual for input to the long-term and short-term linear prediction models. The FCB provides the residual speech components not captured by the short-term and long-term linear prediction models. A residual, and a corresponding index, can be selected at the encoder based on an analysis-by-synthesis process that is performed to choose the best parameters so as to match the original speech signal as closely as possible.

The index can be sent to the decoder, which can extract the corresponding LTP residual from the FCB based on the index.

Figure 2:
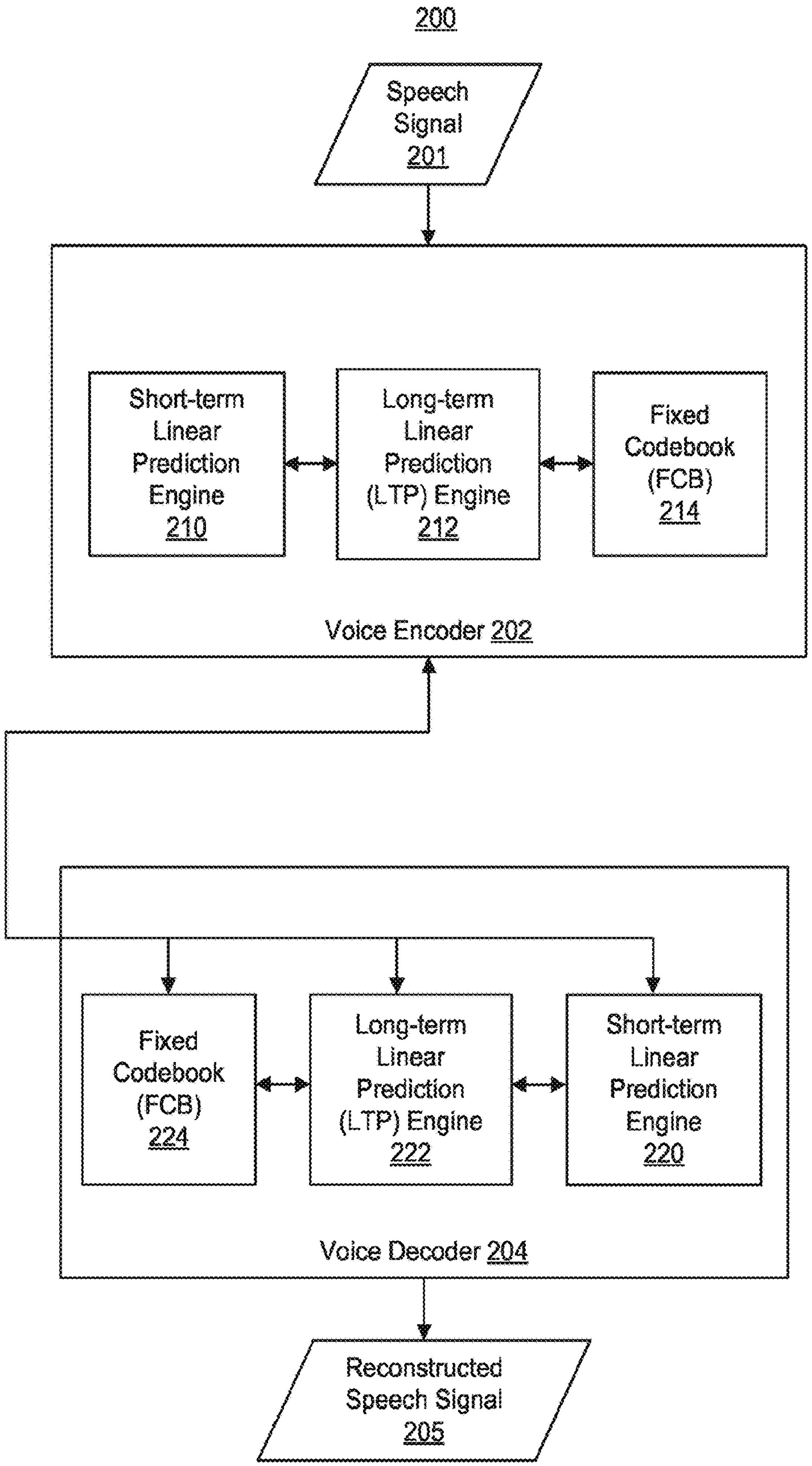
FIG. 2 is a block diagram illustrating an example of a CELP-based voice coding system utilizing a fixed codebook (FCB), in accordance with some examples.

FIG. 2 is a block diagram illustrating an example of a CELP-based voice coding system 200, including a voice encoder 202 and a voice decoder 204. The voice encoder 202 can obtain a speech signal 201 and can segment the samples of the speech signal into frames and sub-frames. For instance, a frame of N samples can be divided into sub-frames. In one illustrative example, a frame of 240 samples can be divided into four sub-frames each having 60 samples. For each frame, sub-frame, or sample, the voice encoder 202 chooses the parameters (e.g., gain, filter coefficients or linear prediction (LP) coefficients, etc.) for a synthetic speech signal so as to match as much as possible the synthetic speech signal with the original speech signal.

The voice encoder 202 can include a short-term linear prediction (LP) engine 210, a long-term linear prediction (LTP) engine 212, and a fixed codebook (FCB) 214. The short-term LP engine 210 models the spectral shape (phoneme) of the speech signal. For example, the short-term LP engine 210 can perform a short-term LP analysis on each frame to yield linear prediction (LP) coefficients. In some examples, the input to the short-term LP engine 210 can be the original speech signal or a pre-processed version of the original speech signal. In some implementations, the short-term LP engine 210 can perform linear prediction for each frame by estimating the value of a current speech sample based on a linear combination of past speech samples. For example, a speech signal s(n) can be represented using an autoregressive (AR) model, such as $s(n)=\sum_{k=1}^{m}\alpha_k s(n-k)+e(n)$, where each sample is represented as a linear combination of the previous m samples plus a prediction error term e(n). The weighting coefficients $a_1$, $a_2$, through $a_m$ are referred to as the LP coefficients. The prediction error term e(n) can be found as follows: $e(n)=s(n)-\sum_{k=1}^{m}\alpha_k s(n-k)$. By minimizing the mean square prediction error with respect to the filter coefficients, the short-term LP engine 210 can obtain the LP coefficients. The LP coefficients can be used to form an analysis filter:

$$\begin{aligned} A(z) &= 1-\sum_{k=1}^{m} a_k z^{-k} \\ &= 1-P(z). \end{aligned}$$

The short-term LP engine 210 can solve for P(z) (which can be referred to as a transfer function) by computing the LP coefficients ($\alpha_k$) that minimize the error in the above AR model equation (s(n)) or other error metric. In some implementations, the LP coefficients can be determined using a Levinson-Durbin method, a Leroux-Gueguen algorithm, or other suitable technique. In some examples, the voice encoder 202 can send the LP coefficients to the voice decoder 204. In some examples, the voice decoder 204 can determine the LP coefficients, in which case the voice encoder 202 may not send the LP coefficients to the voice decoder 204. In some examples, Line Spectral Frequencies (LSFs) can be computed instead of or in addition to LP coefficients.

The LTP engine 212 models the pitch of the speech signal. Pitch is a feature that determines the spacing or periodicity of the impulses in a speech signal. For example, speech signals are generated when the airflow from the lungs is periodically interrupted by movements of the vocal cords. The time between successive vocal cord openings corresponds to the pitch period. The LTP engine 212 can be applied to each frame or each sub-frame of a frame after the short-term LP engine 210 is applied to the frame. The LTP engine 212 can predict a current signal sample from a past sample that is one or more pitch periods apart from a current sample (hence the term "long-term"). For instance, the current signal sample can be predicted as $p_r(n)=g_p r(n-T)$, where T denotes the pitch period, $g_p$ denotes the pitch gain, and r(n−T) denotes an LP residual for a previous sample one or more pitch periods apart from a current sample. Pitch period can be estimated at every frame. By comparing a frame with past samples, it is possible to identify the period in which the signal repeats itself, resulting in an estimate of the actual pitch period. The LTP engine 212 can be applied separately to each sub-frame.

The FCB 214 can include a number (denoted as L) of long-term linear prediction (LTP) residuals. An LTP residual includes the speech signal components that remain after the long-term and short-term linear prediction modeling is performed. The LTP residuals can be, for example, fixed or adaptive and can contain deterministic pulses or random noise (e.g., white noise samples). The voice encoder 202 can pass through the number L of LTP residuals in the FCB 214 a number of times for each segment (e.g., each frame or other group of samples) of the input speech signal, and can calculate an error value (e.g., a mean-squared error value) after each pass. The LTP residuals can be represented using codevectors. The length of each codevector can be equal to the length of each sub-frame, in which case a search of the FCB 214 is performed once every sub-frame. The LTP residual providing the lowest error can be selected by the voice encoder 202. The voice encoder 202 can select an index corresponding to the LTP residual selected from the FCB 214 for a given sub-frame or frame. The voice encoder 202 can send the index to the voice decoder 204 indicating which LTP residual is selected from the FCB 214 for the given sub-frame or frame. A gain associated with the lowest error can also be selected, and send to the voice decoder 204.

The voice decoder 204 includes an FCB 224, an LTP engine 222, and a short-term LP engine 220. The FCB 224 has the same LTP residuals (e.g., codevectors) as the FCB 214. The voice decoder 204 can extract an LTP residual from the FCB 224 using the index transmitted to the voice decoder 204 from the voice encoder 202. The extracted LTP residual can be scaled to the appropriate level and filtered by the LTP engine 222 and the short-term LP engine 220 to generate a reconstructed speech signal 205. The LTP engine 222 creates periodicity in the signal associated with the fundamental pitch frequency, and the short-term LP engine 220 generates the spectral envelope of the signal.

Other linear predictive-based coding systems can also be used to code voice signals, including enhanced voice services (EVS), adaptive multi-rate (AMR) voice coding systems, mixed excitation linear prediction (MELP) voice coding systems, linear predictive coding-10 (LPC-10), among others.

A voice codec for some applications and/or devices (e.g., Internet-of-Things (IoT) applications and devices) is required to deliver higher quality coding of speech signals at low bit-rates, with low complexity, and with low memory requirements. Existing linear predictive-based codecs cannot meet such requirements. For example, ACELP-based coding systems provide high quality, but do not provide low bit-rate or low complexity/low memory. Other linear-predictive coding systems provide low bit-rate and low complexity/low memory, but do not provide high quality.

In some cases, machine learning systems (e.g., using a neural network model) can be used to generate reconstructed voice or audio signals. For example, using features extracted from a frame of audio data, a neural network-based voice decoder can generate coefficients for at least one linear filter. The linear filter can then be used to generate a reconstructed signal. However, such a neural network-based voice decoder can be highly complex and resource intensive. For instance, the neural network-based voice decoder will have to perform the operations of a linear predictive filter (LPC), such as the short-term LP engine 210 of FIG. 2. Such LPC operations can include complex operations that require the use of a large amount of computing resources by the neural network-based voice decoder.

Systems, apparatuses, methods (also referred to as processes), and computer-readable media (collectively referred to as "systems and techniques") are described herein that perform audio coding (e.g., voice decoding) at least in part by combining a linear time-varying filter generated by a machine learning system (e.g., a neural network based model) with a linear predictive coding (LPC) filter that is outside of or separate from the machine learning system. The LPC filter can include a time-varying LPC filter. For instance, the LPC filter can be based on conventional approaches (e.g., where neural network modeling of the LPC filter operations is not performed). By performing the linear predictive coding (by the LPC filter) outside of the neural network-based processing, advantages provided by the audio or voice coding systems described herein as compared to existing neural network based audio or voice codecs include reducing the complexity of the machine learning system (e.g., of the neural network), enhancing the quality of reconstructed speech signals, among others. Such advantages allow such an audio or voice coding systems to be well-suited for various types of applications, for example including mobile (smartphone, etc.), retail (point-of-service (POS), etc.), security, smart cities/buildings, wearables, industrial IoT, IoT space applications in general, among others.

Figure 3:
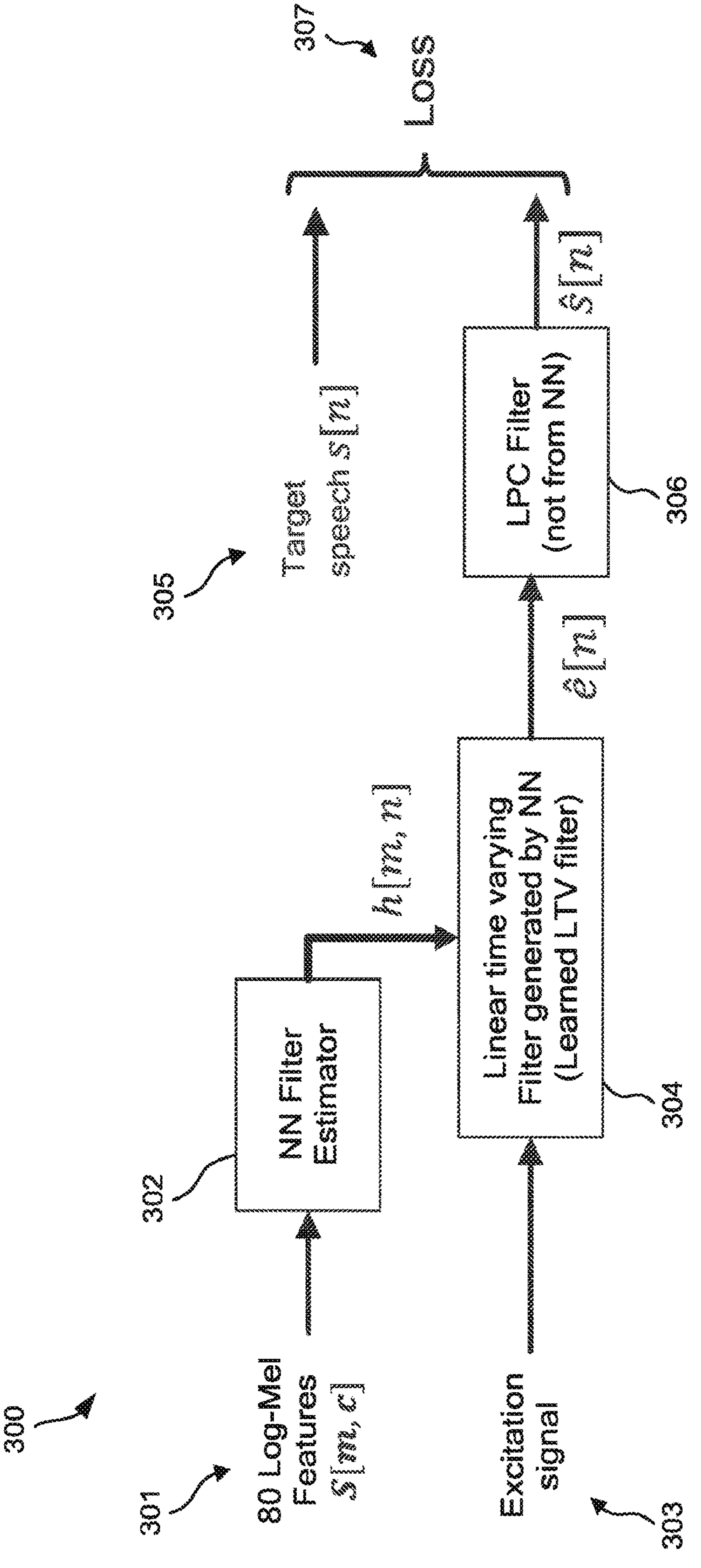
FIG. 3 is a block diagram illustrating an example of a voice coding system utilizing a linear time-varying filter generated using a neural network model and a separate linear predictive coding (LPC) filter, in accordance with some examples.

FIG. 3 is a diagram illustrating an example of a voice decoding system 300 utilizing a linear time-varying filter 304 with coefficients generated using a neural network filter estimator 302 and a separate linear predictive coding (LPC) filter 306. The voice decoding system 300 is configured to decode data of the compressed speech signal to generate a reconstructed speech signal $\hat{s}[n]$ (also referred to as a synthesized speech sample) for a current time instant n that approximates an original speech signal that was previously compressed by a voice encoder (not shown). The voice encoder can be similar to and can perform some or all of the functions of the voice encoder 102 described above with respect to FIG. 1, the voice encoder 202 described above described above with respect to FIG. 2, or other type of voice encoder. For example, the voice encoder can include a short-term LP engine, an LTP engine, and an FCB. In another example, the voice encoder can include a magnitude spectrum generator (e.g., Mel-scale magnitude spectrum or full spectrum magnitude), a short-term linear prediction (LP) engine, and a pitch tracker that detects a fundamental pitch harmonic frequency of the speech and pitch correlation.

The voice encoder can extract (and in some cases quantize) a set of features (referred to as a feature set) from the speech signal, and can send the extracted (and in some cases quantized) feature set to the voice decoding system 300. The features that are computed by the voice encoder can depend on a particular encoder implementation used. Various illustrative examples of feature sets are provided below according to different encoder implementations, which can be extracted by the voice encoder (and in some cases quantized), and sent to the voice decoding system 300. However, one of ordinary skill will appreciate that other feature sets can be extracted by the voice encoder. For example, the voice encoder can extract any set of features, can quantize that feature set, and can send the feature set to the voice decoding system 300.

As noted above, various combinations of features can be extracted as a feature set by the voice encoder. For example, a feature set can include one or any combination of the following features: Linear Prediction (LP) coefficients; Line Spectral Pairs (LSPs); Line Spectral Frequencies (LSFs); pitch lag with integer or fractional accuracy; pitch gain; pitch correlation; Mel-scale frequency cepstral coefficients (also referred to as Mel cepstrum) of the speech signal; Bark-scale frequency cepstral coefficients (also referred to as bark cepstrum) of the speech signal; Mel-scale frequency cepstral coefficients of the LTP residual; Bark-scale frequency cepstral coefficients of the LTP residual; a spectrum (e.g., Discrete Fourier Transform (DFT) or other spectrum) of the speech signal; and/or a spectrum (e.g., DFT or other spectrum) of the LTP residual; voicing level of each frequency band of each speech frame; fundamental frequency of pitch harmonics; pitch correlation of each speech frame; time domain pitch lag of each speech frame.

For any one or more of the other features listed above, the voice encoder can use any estimation and/or quantization method, such as an engine or algorithm from any suitable voice codec (e.g. EVS, AMR, or other voice codec) or a neural network-based estimation and/or quantization scheme (e.g., convolutional or fully-connected (dense) or recurrent Autoencoder, or other neural network-based estimation and/or quantization scheme). The voice encoder can also use any frame size, frame overlap, and/or update rate for each feature. The voice encoder can also include extra redundancies in the features to ensure robustness of operation against packet losses. Examples of estimation and quantization methods for each example feature are provided below for illustrative purposes, where other examples of estimation and quantization methods can be used by the voice encoder.

As noted above, one example of features that can be extracted from a voice signal by the voice encoder includes LP coefficients and/or LSFs. Various estimation techniques can be used to compute the LP coefficients and/or LSFs. For example, as described above with respect to FIG. 2, the voice encoder can estimate LP coefficients (and/or LSFs) from a speech signal using the Levinson-Durbin algorithm. In some examples, the LP coefficients and/or LSFs can be estimated using an autocovariance method for LP estimation. In some cases, the LP coefficients can be determined, and an LP to LSF conversion algorithm can be performed to obtain the LSFs. Any other LP and/or LSF estimation engine or algorithm can be used, such as an LP and/or LSF estimation engine or algorithm from an existing codec (e.g., EVS, AMR, or other voice codec).

Various quantization techniques can be used to quantize the LP coefficients and/or LSFs. For example, the voice encoder can use a single stage vector quantization (SSVQ) technique, a multi-stage vector quantization (MSVQ), or other vector quantization technique to quantize the LP coefficients and/or LSFs. In some cases, a predictive or adaptive SSVQ or MSVQ (or other vector quantization technique) can be used to quantize the LP coefficients and/or LSFs. In another example, an autoencoder or other neural network based technique can be used by the voice encoder to quantize the LP coefficients and/or LSFs. Any other LP and/or LSF quantization engine or algorithm can be used, such as an LP and/or LSF quantization engine or algorithm from an existing codec (e.g., EVS, AMR, or other voice codec).

Another example of features that can be extracted from a voice signal by the voice encoder includes pitch lag (integer and/or fractional), pitch gain, and/or pitch correlation. Various estimation techniques can be used to compute the pitch lag, pitch gain, and/or pitch correlation. For example, the voice encoder can estimate the pitch lag, pitch gain, and/or pitch correlation (or any combination thereof) from a speech signal using any pitch lag, gain, correlation estimation engine or algorithm (e.g. autocorrelation-based pitch lag estimation). For example, the voice encoder can use a pitch lag, gain, and/or correlation estimation engine (or algorithm) from any suitable voice codec (e.g. EVS, AMR, or other voice codec). Various quantization techniques can be used to quantize the pitch lag, pitch gain, and/or pitch correlation. For example, the voice encoder can quantize the pitch lag, pitch gain, and/or pitch correlation (or any combination thereof) from a speech signal using any pitch lag, gain, correlation quantization engine or algorithm from any suitable voice codec (e.g. EVS, AMR, or other voice codec). In some cases, an autoencoder or other neural network based technique can be used by the voice encoder to quantize the pitch lag, pitch gain, and/or pitch correlation features.

Another example of features that can be extracted from a voice signal by the voice encoder includes the Mel cepstrum coefficients and/or Bark cepstrum coefficients of the speech signal, and/or the Mel cepstrum coefficients and/or Bark cepstrum coefficients of the LTP residual. Various estimation techniques can be used to compute the Mel cepstrum coefficients and/or Bark cepstrum coefficients. For example, the voice encoder can use a Mel or Bark frequency cepstrum technique that includes Mel or Bark frequency filterbanks computation, filterbank energy computation, logarithm application, and discrete cosine transform (DCT) or truncation of the DCT. Various quantization techniques can be used to quantize the Mel cepstrum coefficients and/or Bark cepstrum coefficients. For example, vector quantization (single stage or multistage) or predictive/adaptive vector quantization can be used. In some cases, an autoencoder or other neural network based technique can be used by the voice encoder to quantize the Mel cepstrum coefficients and/or Bark cepstrum coefficients. Any other suitable cepstrum quantization methods can be used.

Another example of features that can be extracted from a voice signal by the voice encoder includes the spectrum of the speech signal and/or the spectrum of the LTP residual. Various estimation techniques can be used to compute the spectrum of the speech signal and/or the LTP residual. For example, a Discrete Fourier transform (DFT), a Fast Fourier Transform (FFT), or other transform of the speech signal can be determined. Quantization techniques that can be used to quantize the spectrum of the voice signal can include vector quantization (single stage or multistage) or predictive/adaptive vector quantization. In some cases, an autoencoder or other neural network based technique can be used by the voice encoder to quantize the spectrum. Any other suitable spectrum quantization methods can be used.

As noted above, any one of the above-described features or any combination of the above-described features can be estimated, quantized, and sent by the voice encoder to the voice decoding system 300 depending on the particular encoder implementation that is used. In one illustrative example, the voice encoder can estimate, quantize, and send LP coefficients, pitch lag with fractional accuracy, pitch gain, and pitch correlation. In another illustrative example, the voice encoder can estimate, quantize, and send LP coefficients, pitch lag with fractional accuracy, pitch gain, pitch correlation, and the Bark cepstrum of the speech signal. In another illustrative example, the voice encoder can estimate, quantize, and send LP coefficients, pitch lag with fractional accuracy, pitch gain, pitch correlation, and the spectrum (e.g., DFT, FFT, or other spectrum) of the speech signal. In another illustrative example, the voice encoder can estimate, quantize, and send pitch lag with fractional accuracy, pitch gain, pitch correlation, and the Bark cepstrum of the speech signal. In another illustrative example, the voice encoder can estimate, quantize, and send pitch lag with fractional accuracy, pitch gain, pitch correlation, and the spectrum (e.g., DFT, FFT, or other spectrum) of the speech signal. In another illustrative example, the voice encoder can estimate, quantize, and send LP coefficients, pitch lag with fractional accuracy, pitch gain, pitch correlation, and the Bark cepstrum of the LTP residual. In another illustrative example, the voice encoder can estimate, quantize, and send LP coefficients, pitch lag with fractional accuracy, pitch gain, pitch correlation, and the spectrum (e.g., DFT, FFT, or other spectrum) of the LTP residual.

The voice decoding system 300 includes a neural network filter estimator 302, a linear time-varying filter generated by the neural network 304, and a linear predictive coding (LPC) filter 306. The LPC filter 306 can include a time-varying LPC filter. The neural network filter estimator 302 is trained to generate filter coefficients for the linear time-varying filter 304. The neural network model of the neural network filter estimator 302 can include any neural network architecture that can be trained to model the filter coefficients for the linear time-varying filter 304. Examples of neural network architectures that can be included in the neural network filter estimator 302 include Fully-Connected Networks, Convolutional Networks, Recurrent Networks, Transformer Networks, Autoencoder Networks, any combination thereof, and/or other neural network architectures.

The voice decoding system 300 (e.g., the neural network model of the neural network filter estimator 302) can be trained using any suitable neural network training technique. Examples of neural network training techniques include a distortion loss on fixed or learned features, with an adversarial (Generative Adversarial Networks) loss, a likelihood-based loss, a diffusion-based loss, or any of their combinations. In some examples, the neural network model of the neural network filter estimator 302 can be trained using supervised learning techniques based on backpropagation. For instance, corresponding input and target output pairs can be provided to the neural network filter estimator 302 for training. In one example, for each time instant n, the input to the neural network filter estimator 302 can include log-Mel-frequency spectrum features or coefficients (e.g., 80 log-Mel features s[m, c] 301 shown in FIG. 3). In some examples, the target output (or label or ground truth) for training the neural network filter estimator 302 can include the target speech sample s[n] 305 for the current time instant n, as shown in FIG. 3. In such examples, a loss 307 will be computed based on the reconstructed sample ŝ[n] and the target output speech sample s[n] 305 for time instant n. In some examples, the target output can include a speech signal e[n] that is generated after passing the target speech through an LPC analysis filter (inverse of LPC filter 306). In this case, the loss will be computed based on the output ê[n] generated by the linear time-varying filter generated by the neural network 304 and the target output e[n] (e.g., where both are in speech residual domain).

Backpropagation can be performed to train the neural network filter estimator 302 (e.g., to tune or adjust parameters of the neural network filter estimator 302, such as weights, biases, and/or other parameters) using the inputs and the target output. Backpropagation can include a forward pass, a loss function, a backward pass, and a parameter update to update one or more parameters (e.g., weight, bias, or other parameter). The forward pass, loss function, backward pass, and parameter update are performed for one training iteration. The process can be repeated for a certain number of iterations for each set of inputs until the neural network filter estimator 302 is trained well enough so that the weights (and/or other parameters) of the various layers are accurately tuned.

The forward pass can include passing the input data (e.g., the log-mel-frequency spectrum features or coefficients, such as the 80 log-mel features s[m, c] 301 shown in FIG. 3) through the neural network filter estimator 302. The weights of the neural network model are initially randomized before the neural network filter estimator 302 is trained. For a first training iteration for the neural network filter estimator 302, the output will likely include values that do not give preference to any particular output due to the weights being randomly selected at initialization. With the initial weights, the neural network filter estimator 302 is unable to determine low level features and thus cannot make an accurate estimation of the filter coefficients for the linear time-varying filter 304. A loss function can be used to analyze the loss 307 (or error) in the reconstructed or synthesized sample output ŝ[n]. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times the actual answer minus the predicted (output) answer squared. The loss can be set to be equal to the value of $E_{total}$. Other loss functions may include a difference of magnitude spectrums between the target and output signals, where the difference may be computed as absolute difference, squared difference, or logarithmic difference between the magnitude spectrum of each speech frame, and then aggregated over all speech frames.

The loss (or error) will be high for the first training iterations since the actual values will be much different than the predicted output. The goal of training is to minimize the amount of loss so that the predicted output is the same as the training label. The neural network filter estimator 302 can perform a backward pass by determining which inputs (weights) most contributed to the loss of the network, and can adjust the weights so that the loss decreases and is eventually minimized.

As noted above, the backpropagation process may be performed during training to feed the loss (e.g., the loss of the network) back through the neural network to adjust the parameters of the network (e.g., weights, biases, etc.). In some cases, derivatives of functions applied by the neural network (e.g., in the forward direction) may be used to calculate how to adjust weights based on the loss. For instance, a derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

In some examples, to train the neural network filter estimator 302, a multi-resolution STFT loss $L_R$ and adversarial losses $L_G$ and $L_D$ can be computed from x[n] and s[n]. Because linear time-varying filters are fully differentiable, gradients can propagate back to the neural network filter estimator 302.

Using the filter coefficients generated by the neural network filter estimator 302, the linear time-varying filter 304 can process an excitation signal 303 to generate another signal ê[n]. The signal ê[n] can be used as an excitation signal to excite the LPC filter 306. The linear time-varying filter 304 is a linear filter, which preserves the linearity property between inputs and outputs. For instance, a linear filter is associated with a mapping $\mathcal{L}: \mathbb{R}^{\mathbb{Z}} \rightarrow \mathbb{R}^{\mathbb{Z}}$, $x[n] \rightarrow y[n] = \mathcal{L}(x[n])$ that has the following property: for any $x_1[n]$, $x_2[n] \in \mathbb{R}^{\mathbb{Z}}$ and any $\alpha, b \in \mathbb{R}$, $\mathcal{L}(\alpha x_1[n] + b\, x_2[n]) = \alpha \mathcal{L}(x_1[n]) + b \mathcal{L}(x_2[n])$. In one illustrative example, if input1 produces output1 and input2 produces output2, then a combined input of (input1+input2) will produce output=output1+output2. The time-varying nature of the linear time-varying filter 304 indicates that the filter response depends on the time of excitation of the linear time-varying filter 304 (e.g., a new set of coefficients used to filter each frame (block of time) of input at the time of excitation). In some cases, time-varying linear filters can be characterized by the set of impulse responses at each time lag $h_k[n] = \mathcal{L}(\delta[n-k])$ for each $k \in \mathbb{Z}$. In some examples, the output of a time varying linear filter is $\mathcal{L}(x[n]) = \Sigma_k x[k] * h_k[n]$ (where * is a convolutional operator) or some heuristic combination of filter input and impulse responses, e.g. overlap-add on windowed and filtered signal segments, etc.

The LPC filter 306 can use the signal ê[n] as input to generate the reconstructed or synthesized speech sample ŝ[n] for the current time instant n. The LPC filter 306 is a linear filter and in some cases is time varying, as defined above with respect to the linear time-varying filter 304. The LPC filter 306 can be a form of time-varying filter used for processing of speech. The LPC filter 306 includes filter coefficients for each speech frame that can be computed using the autocorrelation of a speech or audio signal.

In some examples, the LPC filter 306 can be used to model the spectral shape (or phenome or envelope) of the speech signal. For example, at the voice encoder, a signal x[n[ can be filtered by an autoregressive (AR) process synthesizer to obtain an AR signal. As described above, a linear predictor can be used to predict the AR signal (which can be denoted as prediction $\hat{p}[n]$) as a linear combination of the previous m samples as follows:

$$\hat{P}(z) = \sum_{k=1}^{m} -\hat{a}_k z^{-k} = 1 - \hat{A}(z),$$

where the $\hat{\alpha}_k$ terms ($\hat{\alpha}_1, \hat{\alpha}_2, \ldots \hat{\alpha}_m$) are estimates of the AR parameters (also referred to as LP coefficients). A residual signal can be the difference between the original AR signal and the predicted AR signal represented as prediction $\hat{p}[n]$ (e.g., the difference between the actual sample and the predicted sample). At the voice encoder, the linear prediction coding can be used to find the best linear prediction coefficients for minimizing a quadratic error function, and thus the error. The linear prediction process removes the short-term correlation from the speech signal. The linear prediction coefficients are an efficient way to represent the short-term spectrum of the speech signal. At the voice decoding system 300, the LPC filter 306 determines the prediction $\hat{p}[n]$ for the current sample n using computed or received coefficients and a transfer function $\hat{P}[z]$. For instance, in some examples, the LPC filter coefficients are received from the encoder. In other examples, the voice decoding system 300 can derive the LPC filter coefficients, such as by using other features (e.g., Mel spectrum features) sent by an encoder to the voice decoding system 300, such as shown in FIG. 4B described below. For instance, the voice decoding system 300 can use Mel spectrum features 301 to derive the LPC filter coefficients for the LPC filter 306.

The LPC filter 306 can determine the final reconstructed (or predicted) sample $\hat{s}[n]$ using the output $\hat{e}[n]$ from the linear time-varying filter 304 (for the current sample n)

Figure 4A:
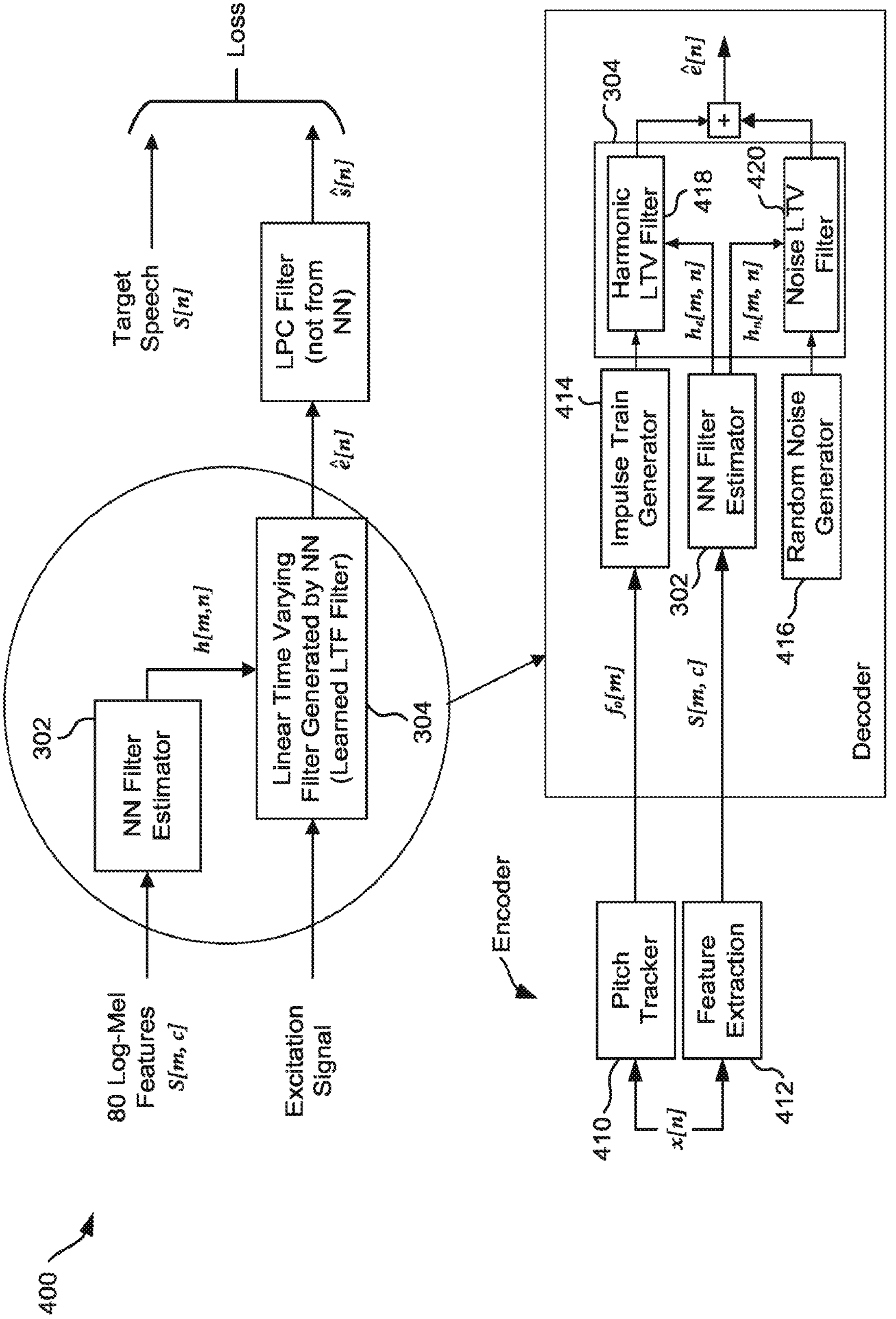
FIG. 4A is a block diagram illustrating another example of a voice coding system utilizing a linear time-varying filter generated using a neural network model and an LPC filter, in accordance with some examples.
Figure 4B:
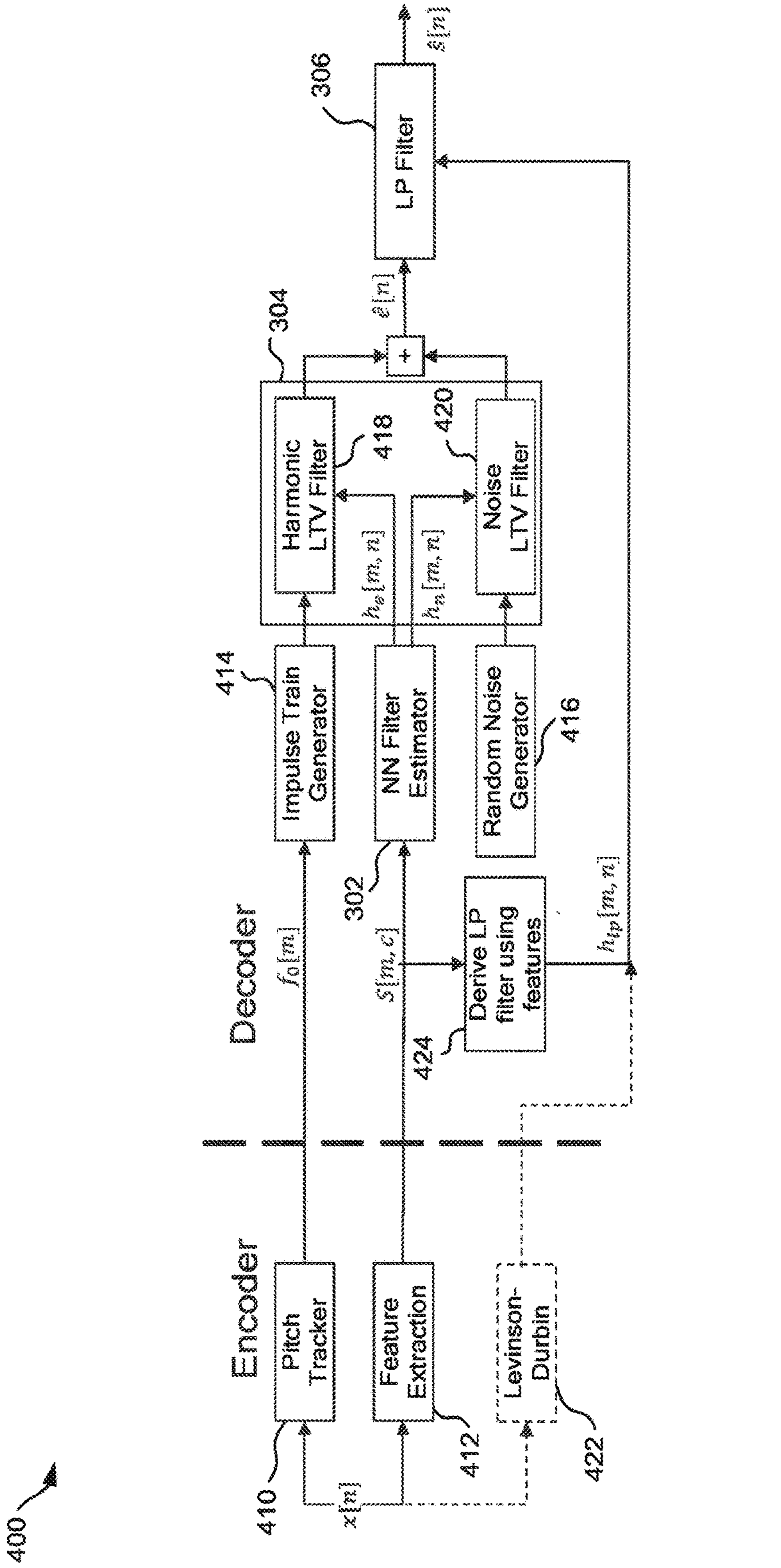
FIG. 4B is a block diagram illustrating another example of a voice coding system utilizing a linear time-varying filter generated using a neural network model and an LPC filter, in accordance with some examples.

FIG. 4A and FIG. 4B are diagrams illustrating details of the neural network filter estimator 302 and the linear time varying filter 304. FIG. 4A and FIG. 4B illustrate further components that can be used along with the neural network filter estimator 302 and the linear time varying filter 304, including an impulse train generator 414 and a random noise generator 416. FIG. 4B further illustrates the LPC filter 306. As shown in FIG. 4A and FIG. 4B, the linear time varying filter 304 can include a harmonic linear time-varying filter 418 and a noise linear time-varying filter 420. As further illustrated in FIG. 4A and FIG. 4B, a voice encoder can include a pitch tracker 410, a feature extraction engine 412, and a Levinson-Durbin engine 422 (shown in FIG. 4B).

In some cases, the original speech signal x and reconstructed signal s are divided into non-overlapping frames with frame length L. The term m can be defined as a frame index, the term n can be defined as a discrete time index, and the term c can be defined as a feature index. The total number of frames M and total number of sampling points N may follow N=M×L. In $f_0$, S, $h_h$, $h_n$, 0≤m−1. The terms x, s, p, u, $s_h$, $s_n$ are finite duration signals, in which 0≤n<N−1. Impulse responses $h_h$, and $h_n$ may be infinitely long, in which n∈ ℤ. Impulse response h may be causal, in which n∈ ℤ EZ and n≥0.

To perform the speech synthesis process, the impulse train generator 414 can generate an impulse train p[n] (e.g., pulse train) from a frame-wise fundamental frequency $f_0$[m] output by the pitch tracker 410. In one illustrative example, the impulse train generator 414 can generate alias-free discrete time impulse trains using additive synthesis. For instance, as illustrated in equation (1) below, the impulse train generator 414 can use a low-passed sum of sinusoids to generate an impulse train:

$$p(t) = \begin{cases} \sum_{k=1}^{2kf_0(t)<f_s} \cos\left(\int_0^t 2\pi k\ f_0(\tau)d\tau\right), & \text{if } f_0(t) > 0 \\ 0, & \text{if } f_0(t) = 0 \end{cases} \tag{1}$$

where $f_0$(t) is reconstructed from $f_0$[m] with zero-order hold or linear interpolation, p[n]=p(n/$f_s$), and $f_s$ is the sampling rate. In some cases, the computationally complexity of additive synthesis can be reduced with approximations. For example, the impulse train generator 414 or other component (e.g., a processor) of the voice decoding system 300 can round the fundamental periods to the nearest multiples of the sampling period. In such an example, the discrete impulse train is sparse. The impulse train generator 414 can then generate the impulse train sequentially (e.g., one pitch mark at a time).

The pitch tracker 410 can process the input X[n] for the time instant n to generate the frame-wise fundamental frequency $f_0$[m] output, which is provided to and processed by the impulse train generator 414 of the voice decoding system 400. The random noise generator 416 of the voice decoding system 400 can sample a noise signal u[n] from a Gaussian distribution.

The neural network filter estimator 302 can estimate impulse responses $h_e$[m, n] and $h_n$[m, n] for each frame, given the log-Mel spectrogram S[m, c] extracted from the input X[n] by the feature extraction engine 412 of the encoder. In some aspects, complex cepstrums ($\hat{h}_e$ and $\hat{h}_n$) can be used as the internal description of impulse responses ($h_e$ and $h_n$) for the neural network filter estimator 302. Complex cepstrums describe the magnitude response and the group delay of filters simultaneously. The group delay of filters affects the timbre of speech. In some cases, instead of using linear-phase or minimum-phase filters, the neural network filter estimator 302 can use mixed-phase filters, with phase characteristics learned from the dataset.

In some examples, the length of a complex cepstrum can be restricted, essentially restricting the levels of detail in the magnitude and phase response. Restricting the length of a complex cepstrum can be used to control the complexity of the filters. In some cases, the neural network filter estimator 302 can predicts low-frequency coefficients, in which the high-frequency cepstrum coefficients can be set to zero. In one illustrative example, two 10 millisecond (ms) long complex cepstrums are predicted in each frame. In some cases, the neural network filter estimator 302 can use a discrete Fourier transform (DFT) and an inverse-DFT (IDFT) to generate the impulse responses $h_e$ and $h_n$. In some cases, the neural network filter estimator 302 can approximate an infinite impulse response (IIR) ($h_e$[m, n] and $h_n$[m, n]) using Finite impulse responses (FIRs). The DFT size can be set to at least a threshold size (e.g., N=1024) to avoid aliasing.

Using the impulse response $h_e[m, n]$, the harmonic LTV filter 418 can filter the impulse train p[n] from the impulse train generator 414 to generate a harmonic component $s_e[n]$. Using the impulse response $h_n[m, n]$, the noise LTV filter 420 can filter the noise signal u[n] to generate a noise component $s_n[n]$. The voice decoding system 300 can combine (e.g., by summing/adding or otherwise combining) the output of the harmonic LTV filter 418 (the harmonic component $s_e[n]$) and the output of the noise LTV filter 420 (the noise component $s_n[n]$) can be combined (e.g., summed or otherwise combined) to obtain the excitation signal e[n].

As described above with respect to FIG. 3, and as shown in FIG. 4B, the LPC filter 306 can use the signal $\hat{e}[n]$ as input to generate the reconstructed or synthesized speech sample $\hat{s}[n]$ for the current time instant n. In some examples, the Levinson-Durbin engine 422 in the encoder can generate linear prediction (LP) coefficients $h_{l_p}[m, n]$ that can be used by the LPC filter 306 to process the signal $\hat{e}[n]$ for generating the reconstructed or synthesized speech sample $\hat{s}[n]$. In some examples, a filter derivation engine 424 of the voice decoding system 400 can derive the linear prediction coefficients $h_{l_p}[m, n]$ for the LPC filter 306 based on features (e.g., Mel spectrum features) provided by the feature extraction engine 412 of the encoder. The derived linear prediction coefficients $h_{l_p}[m, n]$ can then be used by the LPC filter 306 to process the signal $\hat{e}[n]$ for generating the reconstructed or synthesized speech sample $\hat{s}[n]$. The dashed lines shown for the Levinson-Durbin engine 422 in FIG. 4B indicate an optional path. For instance, in some cases as noted above, the filter derivation engine 424 can derive the LP coefficients filter coefficients using features received at the voice decoding system 300 (e.g., which can provide a bitrate advantage, due to there being no need for the encoder to send the linear prediction coefficients separately).

Based on the LPC filter 306 being outside of or separate from the neural network filter estimator 302 and the linear time varying filter 304, the complexity of the neural network estimator 302 can be reduced as compared to existing neural network based voice codecs that generate the reconstructed signal (e.g., reconstructed sample $\hat{s}[n]$). Such complexity reduction is due at least in part to the neural network filter estimator 302 not needing to perform the functions (e.g., linear prediction filtering) of the LPC filter 306. Including a separate LPC filter 306 apart from the neural network filter estimator 302 and the linear time varying filter 304 can also enhance the quality of reconstructed speech signals output by the LPC filter 306. For instance, by removing the LPC functions from the neural network filter estimator 302, the neural network filter estimator 302 can use additional resources for determining a high-quality signal $\hat{e}[n]$. Based on the higher quality signal $\hat{e}[n]$, the LPC filter 306 can generate a higher-quality reconstructed speech sample $\hat{s}[n]$ as compared to a reconstructed speech sample that would be output by a neural network based decoder that directly outputs the reconstructed speech signal.

While the voice decoding system 300 is shown to include certain components, one of ordinary skill will appreciate that the voice decoding system 300 can include more or fewer components than those shown in FIG. 3. For example, in some instances, the voice decoding system 300 can also include one or more other memory components (e.g., one or more caches, buffers, RAMs, ROMs, and/or the like), storage components, display components, processing components, circuits, controllers, sensors, interfaces, ASICs (application-specific integrated circuits), etc., that are not shown in FIG. 3. Moreover, in some cases, the voice decoding system 300 can be part of a computing system that can include one or more components, such as one or more wireless transceivers, one or more input devices (e.g., a touch screen, a keyboard, a mouse, an input sensor, etc.), one or more output devices (e.g., a display, a speaker, a projector, etc.), one or more storage devices, one or more other processing devices, etc., that are not shown in FIG. 3.

The voice decoding system 300 can be part of or can be implemented by a computing device. In some implementations, the computing device can include an electronic device, such as a camera (e.g., a digital camera, a camera phone, a video phone, a tablet device with a built-in camera or other suitable capture device), a mobile or stationary telephone handset (e.g., smartphone, cellular telephone, or the like), a desktop computer, a laptop or notebook computer, a tablet computer, a head-mounted display (HMD) or virtual reality headset, a heads-up display (HUD), a vehicle (e.g., an autonomous vehicle or a human-driven vehicle), a set-top box, a television, a display device, a digital media player, a video gaming console, a video streaming device, or any other suitable electronic device. In some cases, the computing device (or devices) can include one or more wireless transceivers for wireless communications.

In some examples, a voice encoder can be part of a first computing device or computing system (e.g., a server device or system, a vehicle, or other computing device or system), and the voice decoding system 300 can be part of a second computing device or computing system (e.g., a mobile handset, a desktop computer, or other computing device or system). The computing system including the voice encoder and/or the computing system including the voice decoding system 300 can include the computing system 900 described below with respect to FIG. 8. The computing systems (or devices) can be in communication over any available communications networking using any available communication protocol. For example, the computing systems can include user communications interfaces that can perform or facilitate receipt and/or transmission of wired or wireless communications using wired and/or wireless transceivers (or separate receivers and transmitters). Various illustrative examples of input-output devices and communications protocols are provided below with respect to FIG. 8.

Figure 5:
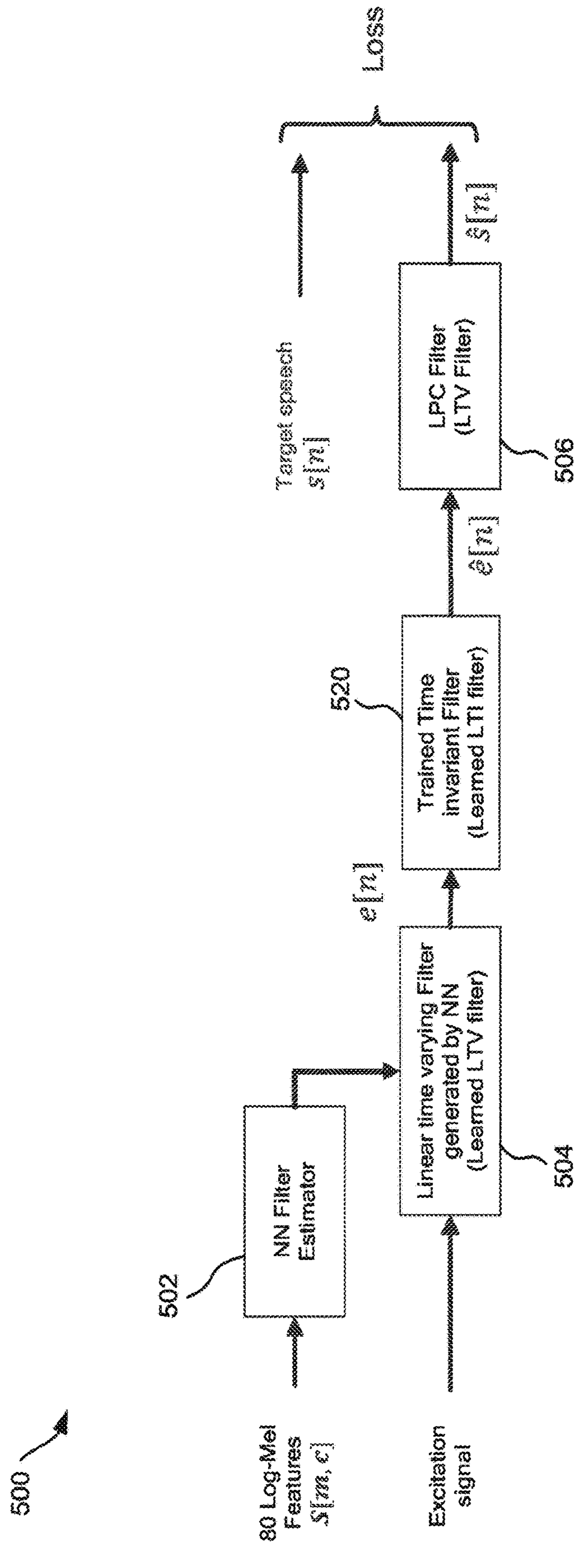
FIG. 5 is a block diagram illustrating an example of a voice coding system utilizing a linear time-varying filter generated using a neural network model, a linear time-invariant filter, and an LPC filter, in accordance with some examples.

FIG. 5 is a block diagram illustrating an example of a voice decoding system 500 utilizing a linear time-varying filter 504 with coefficients generated using a neural network filter estimator 502, a linear time-invariant filter 520, and an LPC filter 506. The LPC filter 506 can operate similarly as the LPC filter 306 of FIG. 3. The neural network filter estimator 502 and the linear time-varying filter 504 can operate similarly as the neural network filter estimator 302 and the linear time varying filter 304 of FIG. 3, but can output an excitation signal e[n] for the trained time invariant filter 520 (as opposed to a signal $\hat{e}[n]$ that is output by the linear time varying filter 304 of FIG. 3).

The trained time invariant filter 520 can have a fixed set of filter coefficients that do not change on a frame-by-frame basis (whereas the coefficients of the linear time-varying filter 504 change frame to frame based on the output of the neural network filter estimator 502). The trained time invariant filter 520 can process the excitation signal e[n] using the fixed set of filter coefficients to output the signal $\hat{e}[n]$. Including the trained time invariant filter 520 in the voice decoding system 500 can provide advantages. For example, the trained time invariant filter 520 may be used to shape the output, such as by adding a small frequency spectrum tilt to the output.

The voice decoding system 500 (e.g., the neural network filter estimator 502) can be trained using similar techniques as that described with respect to FIG. 3, FIG. 4A, and/or FIG. 4B. In some examples, the coefficients of the time invariant filter 520 can also be tuned during training of the voice decoding system 500. After the coefficients of the time invariant filter 520 are tuned, the coefficients are fixed for processing speech signals.

Figure 6:
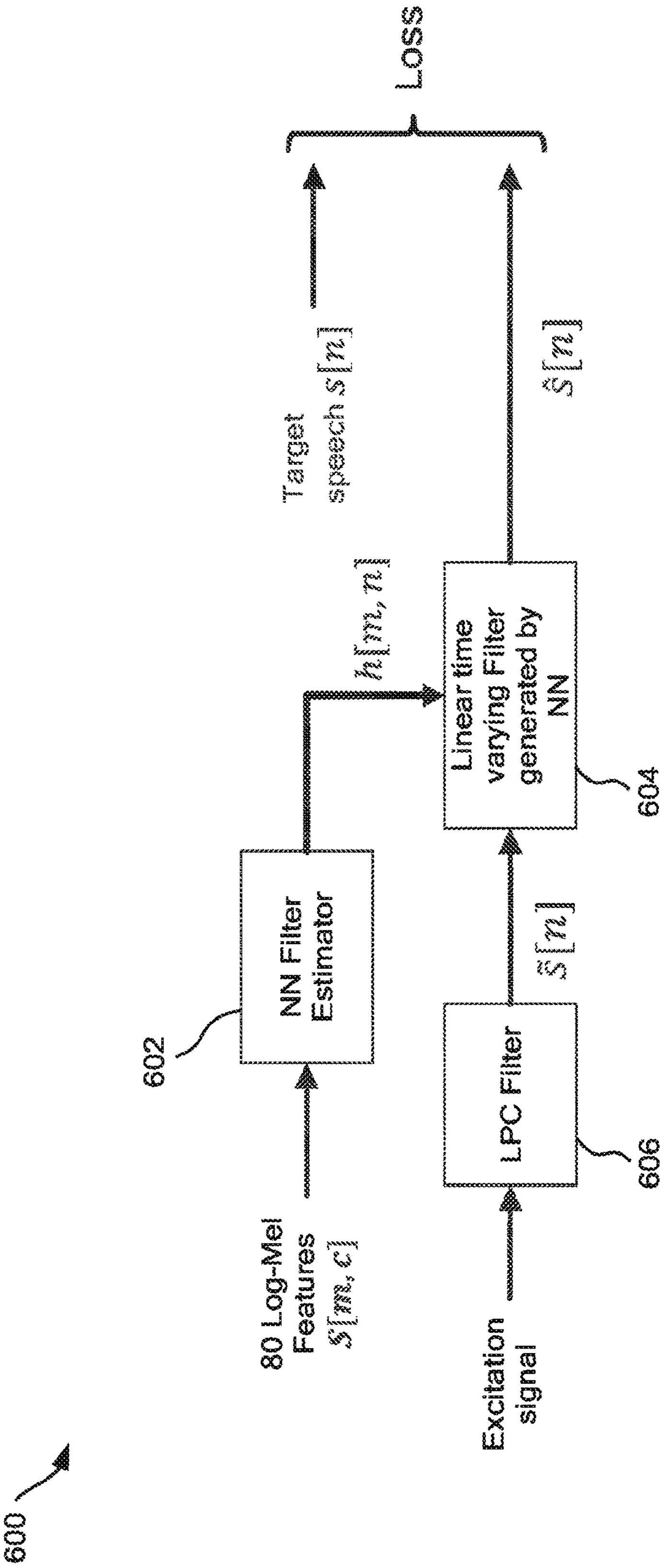
FIG. 6 is a block diagram illustrating another example of a voice coding system utilizing a linear time-varying filter generated using a neural network model and an LPC filter, in accordance with some examples.

FIG. 6 is a block diagram illustrating another example of a voice decoding system 600. As compared to the voice decoding system 300 of FIG. 3, the voice decoding system 600 includes an LPC filter 606 that generates a predicted speech signal $\tilde{s}[n]$ that is then input to the linear time varying filter generated by a neural network 604. The linear time varying filter 604 can process the predicted speech signal $\tilde{s}[n]$ using coefficients determined by the neural network filter estimator 602 to generate a modified and improved speech signal $\tilde{s}[n]$ that is of better quality than $\tilde{s}[n]$ and is closer to target speech signal s[n].

Figure 7:
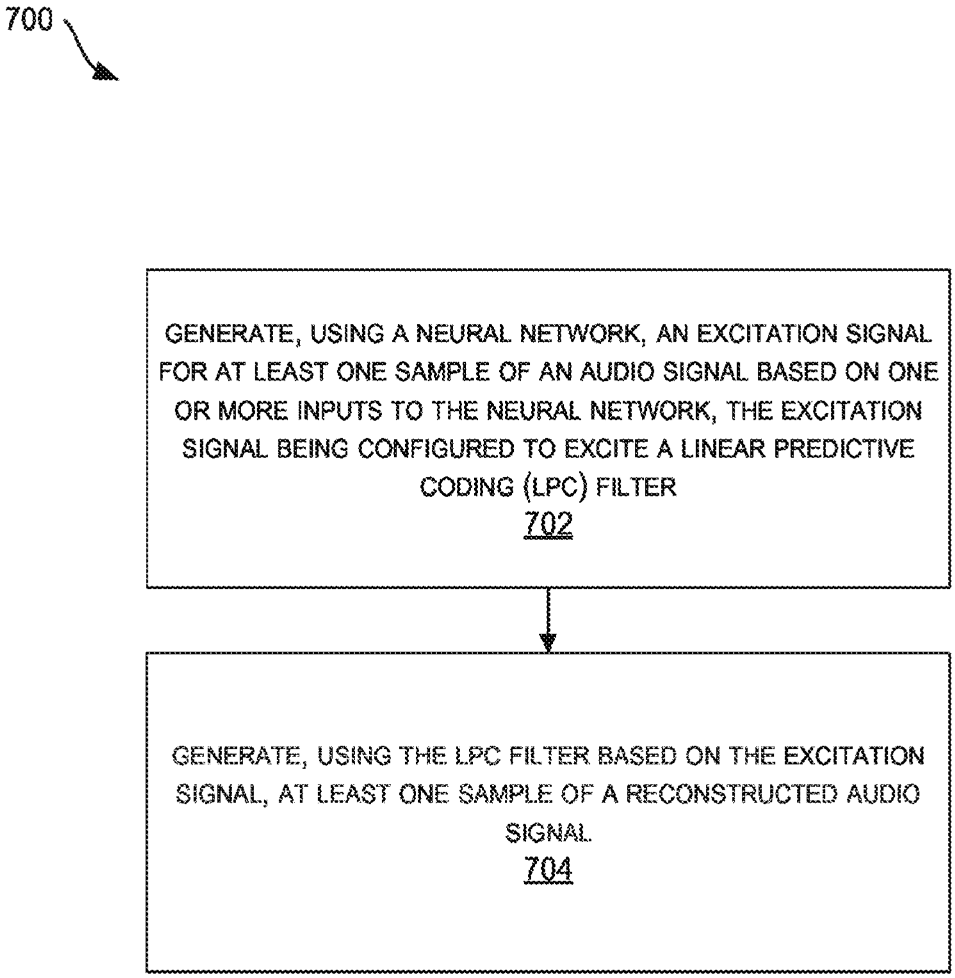
FIG. 7 is a flow chart illustrating an example of a process for reconstructing one or more audio signals, in accordance with some examples.

FIG. 7 is a flowchart illustrating an example of a process 700 for reconstructing one or more audio signals using the techniques described herein. The process 700 can be performed by an audio decoder, such as the voice decoding system 300, the voice decoding system 400, the voice decoding system 500 of FIG. 5, or any other voice decoder configured to perform the operations of process 700. The voice decoders described herein can also be used for decoding other types of audio signals other than speech, such as music signals.

At block 702, the process 700 includes generating, using a neural network, an excitation signal for at least one sample of an audio signal based on one or more inputs to the neural network. The excitation signal is configured to excite a linear predictive coding (LPC) filter. In some aspects, the LPC filter is a time-varying LPC filter. In some examples, the one or more inputs to the neural network include features associated with the audio signal. The features include log-Mel-frequency spectrum features or other features.

At block 704, the process 700 includes generating, using the LPC filter based on the excitation signal, at least one sample of a reconstructed audio signal. In some examples, the process 700 can include using filter coefficients of the LPC filter in the decoder to generate the at least one sample of the reconstructed audio signal. In some cases, the filter coefficients of the LPC filter are generated by a voice encoder, such as based on an autocorrelation of an input audio signal. In some cases, the process 700 can include deriving the filter coefficients of the LPC filter based on features received from a voice encoder. In some examples, the features include Mel spectrum features or other features.

In some aspects, the process 700 can include generating, using the neural network, a harmonic filter output and a noise filter output. For instance, to generate the excitation signal, the process 700 can include combining the harmonic filter output with the noise filter output (e.g., as shown in FIG. 4A and FIG. 4B).

In some examples, to generate the excitation signal for the at least one sample of the audio signal using the neural network, the process 700 can include generating, using the neural network, coefficients for one or more linear time-varying filters. The process 700 can include generating, using the one or more linear time-varying filters including the generated coefficients, the excitation signal. In some cases, the one or more linear time-varying filters include a linear time-varying harmonic filter and a linear time-varying noise filter, such as the harmonic LTV filter 418 and the noise LTV filter 420 of FIG. 4A and FIG. 4B).

In some aspects, the process 700 can include inputting a pulse train signal based on pitch features to a harmonic filter generated using the neural network, generating a harmonic filter output, inputting a random noise signal to a noise filter generated using the neural network, and generating a noise filter output. In some cases, to generate the excitation signal, the process 700 can include combining the harmonic filter output with the noise filter output.

In some aspects, to generate the excitation signal for the at least one sample of the audio signal, the process 700 can include generating, using the neural network, an additional excitation signal for a linear time-invariant filter, such as the time invariant filter 520 of FIG. 5). The process 700 can include generating, using the linear time-invariant filter based on the additional excitation signal, the excitation signal configured to excite the LPC filter.

In some examples, the LPC filter can be before the neural network based linear time-varying filter, such as shown in FIG. 6. In such cases, a process can include generating, using a linear predictive coding (LPC) filter based on an excitation signal, a predicted signal for at least one sample of an audio signal. The predicted signal is configured to excite a linear time-varying filter. The process can include generating, using a neural network, coefficients for the linear time-varying filter. The process can further include generating, using the linear time-varying filter based on the coefficients, at least one sample of a reconstructed audio signal The above-described examples described with respect to FIG. 7 can be used individually or in any combination.

In some examples, the process 700 and any other process or technique described herein may be performed by a computing device or an apparatus, such as a device (e.g., a device having the computing system 800) including the voice coding system 300, the voice coding system 400, or other voice coding system described herein. In some cases, the computing device or apparatus may include one or more input devices, one or more output devices, one or more processors, one or more microprocessors, one or more microcomputers, and/or other component(s) that is/are configured to carry out the operations of process 700. In some examples, the computing device may include a mobile device, a desktop computer, a server computer and/or server system, an extended reality (XR) device (e.g., an augmented reality (AR) device, a virtual reality (VR) device, a mixed reality (MR) device, etc.), a vehicle or a computer component or system of a vehicle, or other type of computing device.

The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display and/or a speaker (as examples of output devices), a network interface configured to communicate and/or receive data, one or more receivers, transmitters, and/or transceivers (as examples of input devices and/or output devices) configured to communicate the voice data. In some examples, the network interface, transceiver, and/or transmitter may be configured to communicate Internet Protocol (IP) based data or other network data.

The processes 700 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 and/or any other process or technique described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
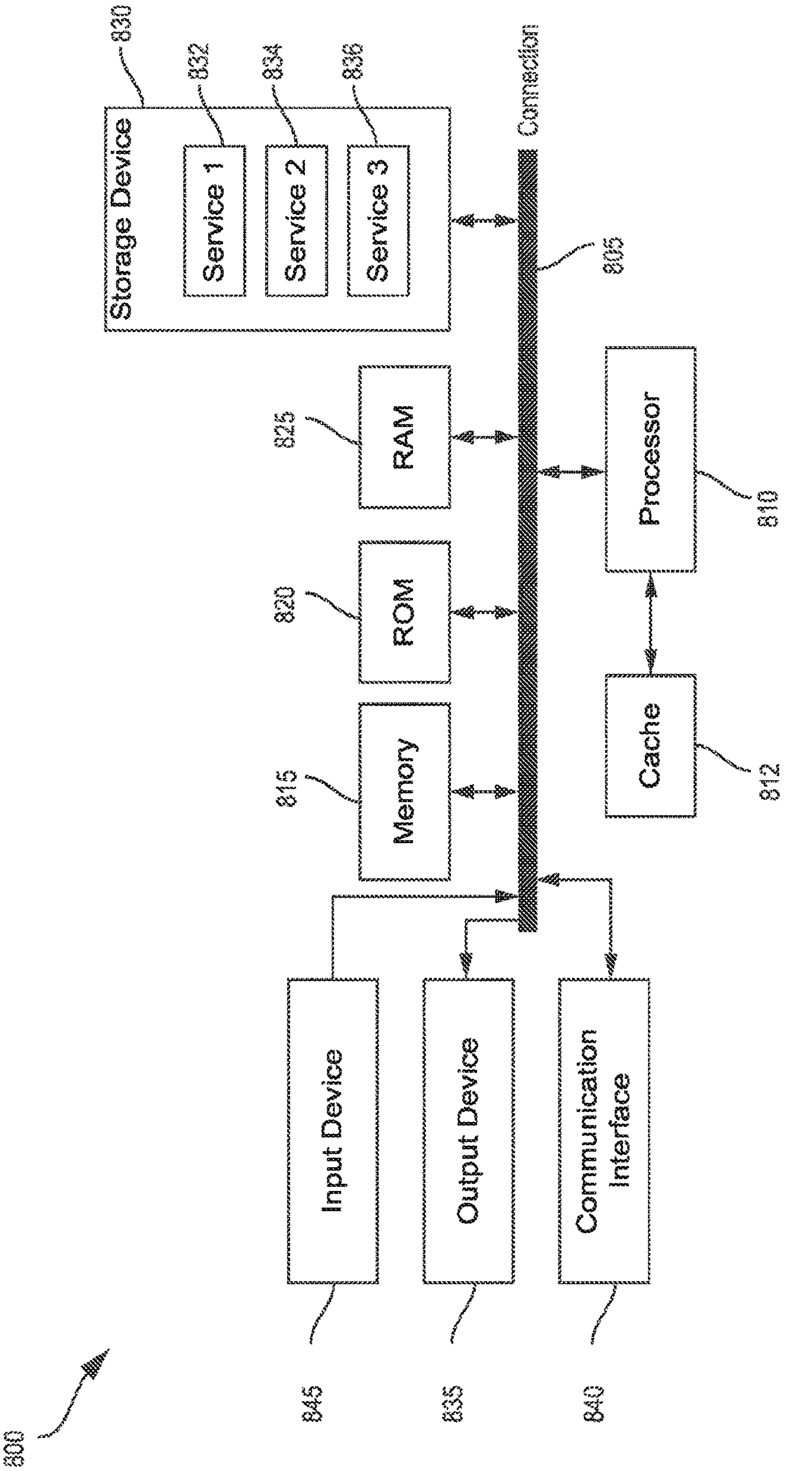
FIG. 8 is an example computing device architecture of an example computing device that can implement the various techniques described herein.

FIG. 8 shows an example of computing system 800, which can implement the various techniques described herein. For example, the computing system 800 can implement the voice coding system 300 shown in FIG. 3 or any other voice coding system described herein. The components of the computing system 800 are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810. In some cases, the computing system 800 can copy data from memory 815 and/or the storage device 830 to the cache 812 for quick access by processor 810. In this way, the cache can provide a performance enhancement that avoids processor 810 delays while waiting for data. These and other modules can control or be configured to control processor 810 to perform various actions. Other computing device memory 815 may be available for use as well. Memory 815 can include multiple different types of memory with different performance characteristics.

Processor 810 can include any general purpose processor and a hardware service or software service, such as a service 1 832, a service 2 834, and a service 3 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art, such as a display, projector, television, speaker device, etc. In some instances, multimodal systems can enable a user to provide multiple types of input/output to communicate with computing system 800. Computing system 800 can include communication interface 840, which can generally govern and manage the user input and system output. The communication interface may perform or facilitate receipt and/or transmission of wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communication interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc optical disc, a holographic optical disk, another optical medium, a secure digital (SD) card, a micro secure digital (microSD) card, a Memory Stick® card, a smartcard chip, a Europay Mastercard and Visa (EMV) chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 830 can include software services (e.g., service 1 832, service 2 834, and service 3 836, and/or other services), servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than (“<”) and greater than (“>”) symbols or terminology used herein can be replaced with less than or equal to (“≤”) and greater than or equal to (“≥”) symbols, respectively, without departing from the scope of this description.

Where components are described as being “configured to” perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase “coupled to” refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting “at least one of” a set and/or “one or more” of a set indicates that one member of the set or multiple members of the set (in any combination) satisfy the claim. For example, claim language reciting “at least one of A and B” means A, B, or A and B. In another example, claim language reciting “at least one of A, B, and C” means A, B, C, or A and B, or A and C, or B and C, or A and B and C. The language “at least one of” a set and/or “one or more” of a set does not limit the set to the items listed in the set. For example, claim language reciting “at least one of A and B” can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term “processor,” as used herein may refer to any of the foregoing structure, any combination of the foregoing structure, or any other structure or apparatus suitable for implementation of the techniques described herein.

Illustrative aspects of the disclosure include:

Aspect 1: An apparatus for reconstructing one or more audio signals, comprising: at least one memory configured to store audio data; and at least one processor coupled to the at least one memory, the at least one processor configured to: generate, using a neural network, an excitation signal for at least one sample of an audio signal based on one or more inputs to the neural network, the excitation signal being configured to excite a linear predictive coding (LPC) filter;

and generate, using the LPC filter based on the excitation signal, at least one sample of a reconstructed audio signal.

Aspect 2: The apparatus of Aspect 1, wherein the one or more inputs to the neural network include features associated with the audio signal.

Aspect 3: The apparatus of Aspect 2, wherein the features include log-Mel-frequency spectrum features.

Aspect 4: The apparatus of any of Aspects 1 to 3, wherein the LPC filter is a time-varying LPC filter.

Aspect 5: The apparatus of any of Aspects 1 to 4, wherein the at least one processor is configured to: use filter coefficients of the LPC filter in the decoder to generate the at least one sample of the reconstructed audio signal.

Aspect 6: The apparatus of Aspect 5, wherein the filter coefficients of the LPC filter are generated based on an autocorrelation of an input audio signal in a voice encoder.

Aspect 7: The apparatus of Aspect 5, wherein the at least one processor is configured to: derive the filter coefficients of the LPC filter based on features received from a voice encoder.

Aspect 8: The apparatus of Aspect 7, wherein the features include Mel spectrum features.

Aspect 9: The apparatus of any of Aspects 1 to 8, wherein: the at least one processor is configured to generate, using the neural network, a harmonic filter output and a noise filter output; and to generate the excitation signal, the at least one processor is configured to combine the harmonic filter output with the noise filter output.

Aspect 10: The apparatus of any of Aspects 1 to 9, wherein, to generate the excitation signal for the at least one sample of the audio signal using the neural network, the at least one processor is configured to: generate, using the neural network, coefficients for one or more linear time-varying filters; and generate, using the one or more linear time-varying filters including the generated coefficients, the excitation signal.

Aspect 11: The apparatus of Aspect 10, wherein the one or more linear time-varying filters include a linear time-varying harmonic filter and a linear time-varying noise filter.

Aspect 12: The apparatus of any of Aspects 1 to 9, wherein, to generate the excitation signal for the at least one sample of the audio signal using the neural network, the at least one processor is configured to: generate, using the neural network, an additional excitation signal for a linear time-invariant filter; and generate, using the linear time-invariant filter based on the additional excitation signal, the excitation signal.

Aspect 13: A method of reconstructing one or more audio signals, the method comprising: generating, using a neural network, an excitation signal for at least one sample of an audio signal based on one or more inputs to the neural network, the excitation signal being configured to excite a linear predictive coding (LPC) filter; and generating, using the LPC filter based on the excitation signal, at least one sample of a reconstructed audio signal.

Aspect 14: The method of Aspect 13, wherein the one or more inputs to the neural network include features associated with the audio signal.

Aspect 15: The method of Aspect 14, wherein the features include log-Mel-frequency spectrum features.

Aspect 16: The method of any of Aspects 13 to 15, wherein the LPC filter is a time-varying LPC filter.

Aspect 17: The method of any of Aspects 13 to 16, further comprising: using filter coefficients of the LPC filter in the decoder to generate the at least one sample of the reconstructed audio signal.

Aspect 18: The method of Aspect 17, wherein the filter coefficients of the LPC filter are generated based on an autocorrelation of an input audio signal in a voice encoder.

Aspect 19: The method of Aspect 17, further comprising: deriving the filter coefficients of the LPC filter based on features received from a voice encoder.

Aspect 20: The method of Aspect 19, wherein the features include Mel spectrum features.

Aspect 21: The method of any of Aspects 13 to 20, further comprising: generating, using the neural network, a harmonic filter output and a noise filter output; and generating the excitation signal at least in part by combining the harmonic filter output with the noise filter output.

Aspect 22: The method of any of Aspects 13 to 21, wherein generating the excitation signal for the at least one sample of the audio signal using the neural network includes: generating, using the neural network, coefficients for one or more linear time-varying filters; and generating, using the one or more linear time-varying filters including the generated coefficients, the excitation signal.

Aspect 23: The method of Aspect 22, wherein the one or more linear time-varying filters include a linear time-varying harmonic filter and a linear time-varying noise filter.

Aspect 24: The method of any of Aspects 13 to 21, wherein generating the excitation signal for the at least one sample of the audio signal using the neural network includes: generating, using the neural network, an additional excitation signal for a linear time-invariant filter; and generating, using the linear time-invariant filter based on the additional excitation signal, the excitation signal.

Aspect 25: The apparatus of any of Aspects 1 to 12, wherein: the at least one processor is configured to: input a pulse train signal based on pitch features to a harmonic filter generated using the neural network; generate a harmonic filter output; input a random noise signal to a noise filter generated using the neural network; and generate a noise filter output; and to generate the excitation signal, the at least one processor is configured to combine the harmonic filter output with the noise filter output.

Aspect 26: The method of any of Aspects 13 to 24, further comprising: inputting a pulse train signal based on pitch features to a harmonic filter generated using the neural network; generating a harmonic filter output; inputting a random noise signal to a noise filter generated using the neural network; generating a noise filter output; and generating the excitation signal at least in part by combining the harmonic filter output with the noise filter output.

Aspect 27: A computer-readable storage medium storing instructions that, when executed by one or more processors, cause the one or more processors to perform operations according to any of Aspects 1 to 26.

Aspect 28: An apparatus for reconstructing one or more audio signals, comprising one or more means for performing operations according to any of Aspects 1 to 26.

Aspect 29: An apparatus for reconstructing one or more audio signals, comprising: at least one memory configured to store audio data; and at least one processor coupled to the at least one memory, the at least one processor configured to: generate, using a linear predictive coding (LPC) filter based on an excitation signal, a predicted signal for at least one sample of an audio signal, the predicted signal being configured to excite a linear time-varying filter; generate, using a neural network, coefficients for the linear time-varying filter; and generate, using the linear time-varying filter based on the coefficients, at least one sample of a reconstructed audio signal.

Aspect 30: A method of reconstructing one or more audio signals, comprising: generating, using a linear predictive coding (LPC) filter based on an excitation signal, a predicted signal for at least one sample of an audio signal, the predicted signal being configured to excite a linear time-varying filter; generating, using a neural network, coefficients for the linear time-varying filter; and generating, using the linear time-varying filter based on the coefficients, at least one sample of a reconstructed audio signal.

Aspect 31: A computer-readable storage medium storing instructions that, when executed by one or more processors, cause the one or more processors to perform operations according to any of Aspects 1 to 30.

Aspect 32: An apparatus for reconstructing one or more audio signals, comprising one or more means for performing operations according to any of Aspects 1 to 30.

What is claimed is:

1. An apparatus for reconstructing one or more audio signals, comprising:
- at least one memory configured to store audio data; and
- at least one processor coupled to the at least one memory, the at least one processor configured to:
  - generate, using a neural network, coefficients for one or more linear time-varying filters;
  - generate, using the one or more linear time-varying filters and based on the coefficients, an excitation signal for at least one sample of an audio signal based on one or more inputs to the neural network, the excitation signal being configured to excite a linear predictive coding (LPC) filter; and
  - generate, using the LPC filter based on the excitation signal, at least one sample of a reconstructed audio signal.

2. The apparatus of claim 1, wherein the one or more inputs to the neural network include features associated with the audio signal.

3. The apparatus of claim 2, wherein the features include log-Mel-frequency spectrum features.

4. The apparatus of claim 1, wherein the LPC filter is a time-varying LPC filter.

5. The apparatus of claim 1, wherein the at least one processor is configured to:
- use filter coefficients of the LPC filter to generate the at least one sample of the reconstructed audio signal.

6. The apparatus of claim 5, wherein the filter coefficients of the LPC filter are generated based on an autocorrelation of an input audio signal in a voice encoder.

7. The apparatus of claim 5, wherein the at least one processor is configured to:
- derive the filter coefficients of the LPC filter based on features received from a voice encoder.

8. The apparatus of claim 7, wherein the features include Mel spectrum features.

9. The apparatus of claim 1, wherein the at least one processor is configured to:
- input a pulse train signal based on pitch features to a harmonic filter generated using the neural network;
- generate a harmonic filter output;
- input a random noise signal to a noise filter generated using the neural network; and
- generate a noise filter output; and
- wherein, to generate the excitation signal, the at least one processor is configured to combine the harmonic filter output with the noise filter output.

10. The apparatus of claim 1, wherein, to generate the excitation signal for the at least one sample of the audio signal using the neural network, the at least one processor is configured to:
- generate, using the neural network, coefficients for one or more linear time-varying filters; and
- generate, using the one or more linear time-varying filters including the generated coefficients, the excitation signal.

11. The apparatus of claim 10, wherein the one or more linear time-varying filters include a linear time-varying harmonic filter and a linear time-varying noise filter.

12. The apparatus of claim 1, wherein, to generate the excitation signal for the at least one sample of the audio signal using the neural network, the at least one processor is configured to:
- generate, using the neural network, an additional excitation signal for a linear time-invariant filter; and
- generate, using the linear time-invariant filter based on the additional excitation signal, the excitation signal.

13. A method of reconstructing one or more audio signals, the method comprising:
- generating, using a neural network, coefficients for one or more linear time-varying filters;
- generating, using the one or more linear time-varying filters and based on the coefficients, an excitation signal for at least one sample of an audio signal based on one or more inputs to the neural network, the excitation signal being configured to excite a linear predictive coding (LPC) filter; and
- generating, using the LPC filter based on the excitation signal, at least one sample of a reconstructed audio signal.

14. The method of claim 13, wherein the one or more inputs to the neural network include features associated with the audio signal.

15. The method of claim 14, wherein the features include log-Mel-frequency spectrum features.

16. The method of claim 13, wherein the LPC filter is a time-varying LPC filter.

17. The method of claim 13, further comprising:
- using filter coefficients of the LPC filter to generate the at least one sample of the reconstructed audio signal.

18. The method of claim 17, wherein the filter coefficients of the LPC filter are generated based on an autocorrelation of an input audio signal in a voice encoder.

19. The method of claim 17, further comprising:
- deriving the filter coefficients of the LPC filter based on features received from a voice encoder.

20. The method of claim 19, wherein the features include Mel spectrum features.

21. The method of claim 13, further comprising:
- inputting a pulse train signal based on pitch features to a harmonic filter generated using the neural network;
- generating a harmonic filter output;
- inputting a random noise signal to a noise filter generated using the neural network;
- generating a noise filter output; and
- generating the excitation signal at least in part by combining the harmonic filter output with the noise filter output.

22. The method of claim 13, wherein generating the excitation signal for the at least one sample of the audio signal using the neural network includes:
- generating, using the neural network, coefficients for one or more linear time-varying filters; and generating, using the one or more linear time-varying filters including the generated coefficients, the excitation signal.

23. The method of claim 22, wherein the one or more linear time-varying filters include a linear time-varying harmonic filter and a linear time-varying noise filter.

24. The method of claim 13, wherein generating the excitation signal for the at least one sample of the audio signal using the neural network includes:

generating, using the neural network, an additional excitation signal for a linear time-invariant filter; and generating, using the linear time-invariant filter based on the additional excitation signal, the excitation signal.

25. An apparatus for reconstructing one or more audio signals, comprising:

at least one memory configured to store audio data; and at least one processor coupled to the at least one memory, the at least one processor configured to:

generate, using a linear predictive coding (LPC) filter based on an excitation signal, a predicted signal for at least one sample of an audio signal, the predicted signal being configured to excite a linear time-varying filter;

generate, using a neural network, coefficients for the linear time-varying filter; and generate, using the linear time-varying filter based on the coefficients, at least one sample of a reconstructed audio signal.

26. The apparatus of claim 25, wherein one or more inputs to the neural network include features associated with the audio signal.

27. The apparatus of claim 25, wherein the LPC filter is a time-varying LPC filter.

28. A method of reconstructing one or more audio signals, comprising:

generating, using a linear predictive coding (LPC) filter based on an excitation signal, a predicted signal for at least one sample of an audio signal, the predicted signal being configured to excite a linear time-varying filter;

generating, using a neural network, coefficients for the linear time-varying filter; and generating, using the linear time-varying filter based on the coefficients, at least one sample of a reconstructed audio signal.

29. The method of claim 28, wherein one or more inputs to the neural network include features associated with the audio signal.

30. The method of claim 28, wherein the LPC filter is a time-varying LPC filter.

* * * * *